(12) United States Patent
Hayashi et al.

(10) Patent No.: US 7,048,002 B2
(45) Date of Patent: May 23, 2006

(54) BOARD-MOUNTED MANIFOLD VALVE

(75) Inventors: Bunya Hayashi, Tsukuba-gun (JP); Hideyuki Takada, Tsukuba-gun (JP); Yukihiro Matarai, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 227 days.

(21) Appl. No.: 10/691,574

(22) Filed: Oct. 24, 2003

(65) Prior Publication Data
US 2004/0089352 A1   May 13, 2004

(30) Foreign Application Priority Data
Nov. 7, 2002  (JP) .............................. 2002-323807

(51) Int. Cl.
 *F16K 27/00* (2006.01)
 *F15B 13/044* (2006.01)
(52) U.S. Cl. .................. 137/560; 137/884; 137/625.65
(58) Field of Classification Search ................ 137/560, 137/884, 625.65
See application file for complete search history.

(56) References Cited

U.S. PATENT DOCUMENTS

| | | | | |
|---|---|---|---|---|
| 4,815,496 A | * | 3/1989 | Nishitani et al. | 137/884 |
| 4,928,730 A | * | 5/1990 | Ando et al. | 137/625.65 |
| 5,234,033 A | * | 8/1993 | Stoll et al. | 137/884 |
| 5,348,047 A | * | 9/1994 | Stoll et al. | 137/560 |
| 5,915,666 A | * | 6/1999 | Hayashi et al. | 137/884 |
| 6,164,323 A | * | 12/2000 | Smith et al. | 137/884 |
| 6,505,642 B1 | * | 1/2003 | Miyazoe et al. | 137/625.65 |
| 6,612,332 B1 | * | 9/2003 | Miyazoe et al. | 137/884 |
| 6,830,067 B1 | * | 12/2004 | Hayashi | 137/884 |
| 6,840,273 B1 | * | 1/2005 | Miyazoe et al. | 137/625.65 |
| 6,913,037 B1 | * | 7/2005 | Miyazoe et al. | 137/884 |

FOREIGN PATENT DOCUMENTS

| | | |
|---|---|---|
| DE | 32 38 750 C2 | 6/1984 |
| DE | 38 34 815 C2 | 4/1990 |
| DE | 39 43 752 C2 | 10/1990 |
| GB | 2 130 440 A | 5/1984 |
| GB | 2 232 722 A | 12/1990 |

OTHER PUBLICATIONS

U.S. Appl. No. 10/698,458, filed Nov. 3, 2003, Hayashi.

\* cited by examiner

*Primary Examiner*—John Rivell
(74) *Attorney, Agent, or Firm*—Oblon, Spivak, McClelland, Maier & Neustadt, P.C.

(57) ABSTRACT

A mounting base portion having a plurality of solenoid valve mounting areas is formed on an upper face of a manifold base. A board having an opening portion is mounted onto the manifold base with the mounting base portion fitted in the opening portion and projecting upward from the board. Solenoid valves are mounted to the respective mounting areas. Solenoid portions of the respective solenoid valves extend over the board from the mounting base portion to cover an upper face of the board.

12 Claims, 4 Drawing Sheets

BOARD-MOUNTED MANIFOLD VALVE

TECHNICAL FIELD

The present invention relates to a board-mounted manifold valve in which a plurality of solenoid valves can be mounted onto a manifold base.

BACKGROUND ART

A manifold valve which is conventionally known in general is formed by arranging a plurality of solenoid valves on a manifold base. Pressure fluid is supplied and discharged to and from the respective solenoid valves through the manifold base. Output pipes are connected to the manifold base or the solenoid valves. In this case, the plurality of solenoid valves are normally fed through an electric circuit on a printed wiring board.

However, in the above known manifold valve, because the plurality of solenoid valves are arranged in a single line, at least a length equal to or greater than a length obtained by multiplying a width of the solenoid valve by the number of the solenoid valves is required of the manifold base and the required length increases as the number of the solenoid valves increases and therefore necessity to use a plurality of manifold valves arises. Therefore, further miniaturization of the manifold valve mounted with the plurality of solenoid valves is desired.

When the plurality of solenoid valves are mounted onto the manifold base, in order to facilitate connection to a circuit for supplying the solenoid valves, a board on which the electric circuit is formed by printed wiring is used. However, the board increases in size as the number of the solenoid valves increases and therefore there is a problem of how to obtain space for housing the board while protecting it.

DISCLOSURE OF THE INVENTION

The present invention has been accomplished to solve the above problems and it is a technical object of the invention to provide a board-mounted manifold valve in which a plurality of solenoid valves can be disposed in limited space on the manifold base and a board for supplying these solenoid valves can easily be mounted with a simple structure to the manifold base while kept in balance.

It is another technical object of the invention to provide a board-mounted manifold valve in which a relatively large board having an electric circuit formed by printed wiring can be disposed close to the solenoid valves without obtaining special large housing space and in a state in which the board is less liable to be damaged when acted on by an external force and the electric circuit on a surface of the board is protected from damage.

To achieve the above objects, according to the invention, there is provided a board-mounted manifold valve comprising: a plurality of solenoid valves each including a valve portion and one or two solenoid portion(s); a manifold base onto which these solenoid valves are mounted; and a board in which an electric circuit for supplying the solenoid valves is incorporated, wherein the manifold base includes a mounting base portion standing upward from an upper face of the manifold base and extending in a longitudinal direction of the manifold base, a plurality of mounting areas arranged in a longitudinal direction of the mounting base portion on an upper face of the mounting base portion, one or two mounting portion(s) formed in each the mounting area, a plurality of openings formed in each the mounting portion, and fluid passages communicating with ports of the solenoid valves through the openings, a height of the mounting base portion being greater than a thickness of the board, the board has an opening portion at its central portion and extending in its longitudinal direction and is mounted onto the manifold base with the mounting base portion fitted in the opening portion and with the mounting base portion projecting upward from the board, and the solenoid valve is mounted to the mounting portion in each the mounting area on the mounting base portion with the solenoid portion(s) extending over the board from the mounting base portion and is electrically connected to the electric circuit on the board through a supplying connector.

According to a structural form of the invention, each the solenoid valve is a single-solenoid solenoid valve having one solenoid portion, each the mounting area of the mounting base portion in the manifold base has two opposed mounting portions positioned on a half portion side and the other half portion side in a width direction of the mounting base portion, the solenoid valves in a pair are mounted close to each other to face each other in the mounting portions, the solenoid portions of the respective solenoid valves extend in opposite directions to each other from the mounting base portion to cover the board.

According to another structural form of the invention, each the solenoid valve is a double-solenoid solenoid valve having two solenoid portions on opposite sides of the valve portion, each the mounting area of the mounting base portion in the manifold base has one mounting portion, the solenoid valve is mounted in the mounting portion with the two solenoid portions extending in opposite directions to each other from the mounting base portion, and the respective solenoid portions cover the board.

According to a preferred structural form of the invention, the board has extension portions extending in directions of left and right opposite side faces of the manifold base, the supplying connector is mounted in positions on the extension portions and corresponding to the respective solenoid valves, the solenoid portions of the solenoid valves extend over the extension portions of the board to cover the upper face of the board with a gap maintained between the board and the solenoid portions, and a receiving terminal to be connected to the supplying connector is provided to each the solenoid portion.

In the invention, the board has a one-operation wiring connector and the one-operation wiring connector is connected to the respective supplying connectors through the electric circuit.

It is preferable that the one-operation wiring connector is provided to a lower face of one of the left and right extension portions of the board.

According to another structural form of the invention, output ports communicating with output ports of the respective solenoid valves are arranged in one of side faces of the manifold base and the one-operation wiring connector is provided to one of the left and right extension portions of the board opposite to a side on which the output ports are formed.

In the above manifold valve, because the upper face of the mounting base portion is divided into a plurality of mounting areas and the solenoid valves are respectively mounted in the respective mounting areas, many solenoid valves can be disposed in limited space on the manifold base.

Because the mounting base portion is formed on the upper face of the manifold base and the board is mounted to the manifold base with the mounting base portion fitted in the opening portion of the board, the board can stably be mounted onto the manifold base while kept in balance owing to a guiding function and a positioning function of the mounting base portion and the mounting structure is simple.

BEST MODE FOR CARRYING OUT THE INVENTION

Figure 1:
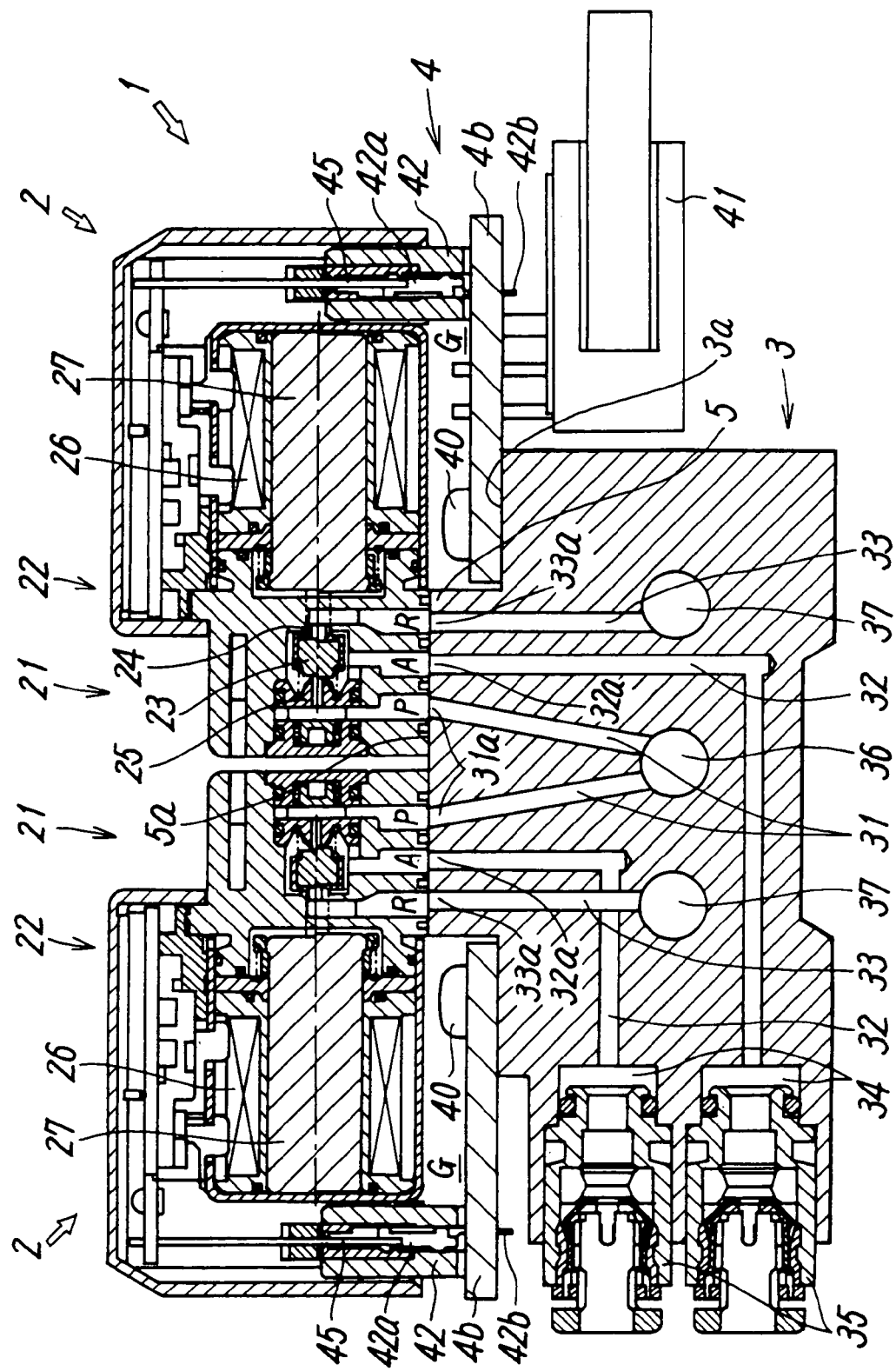
FIG. 1 is a vertical sectional view of an embodiment of a board-mounted manifold valve according to the present invention.
Figure 2:
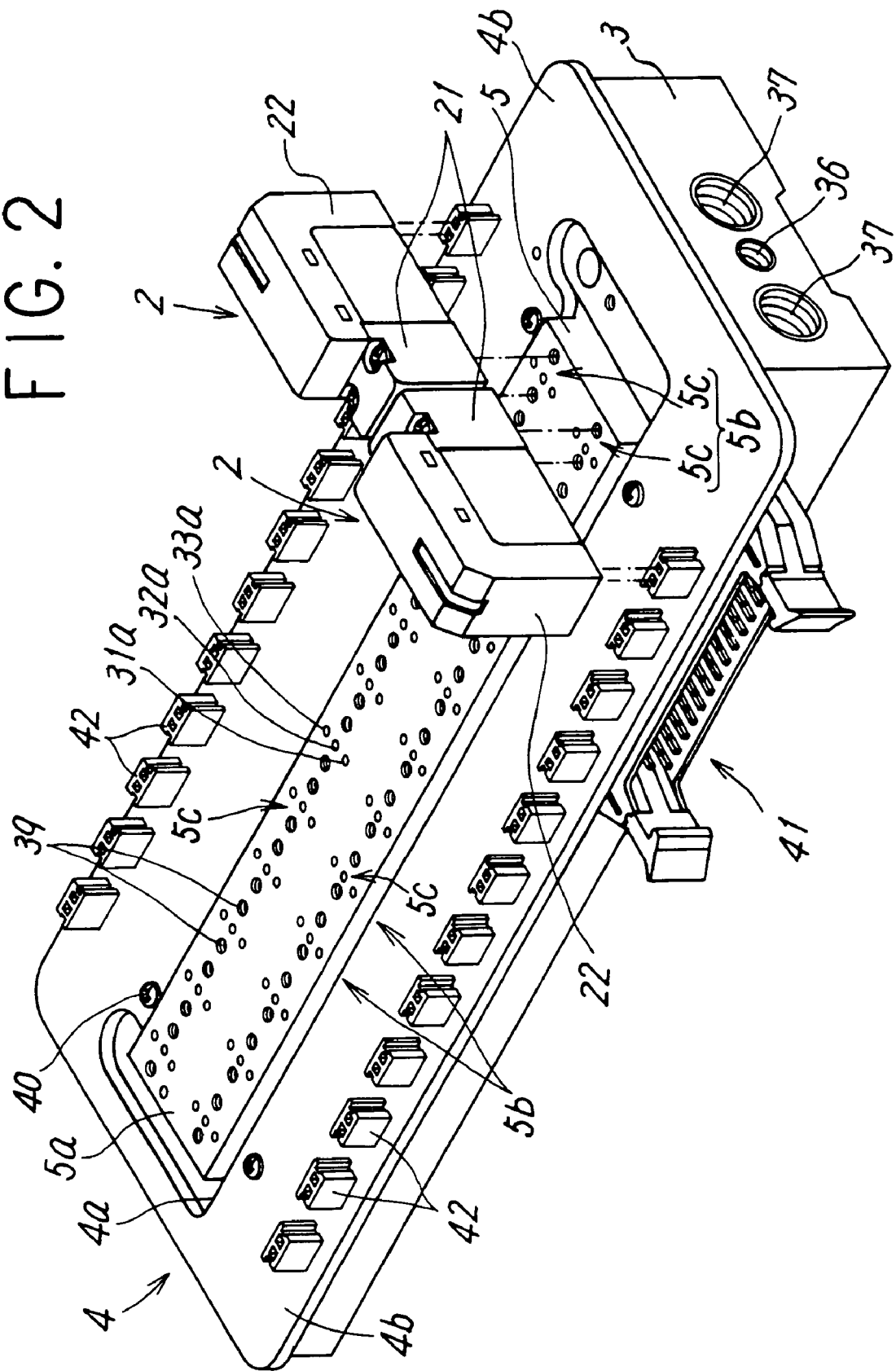
FIG. 2 is a perspective view of the device in which all solenoid valves omitted but one are left behind.
Figure 3:
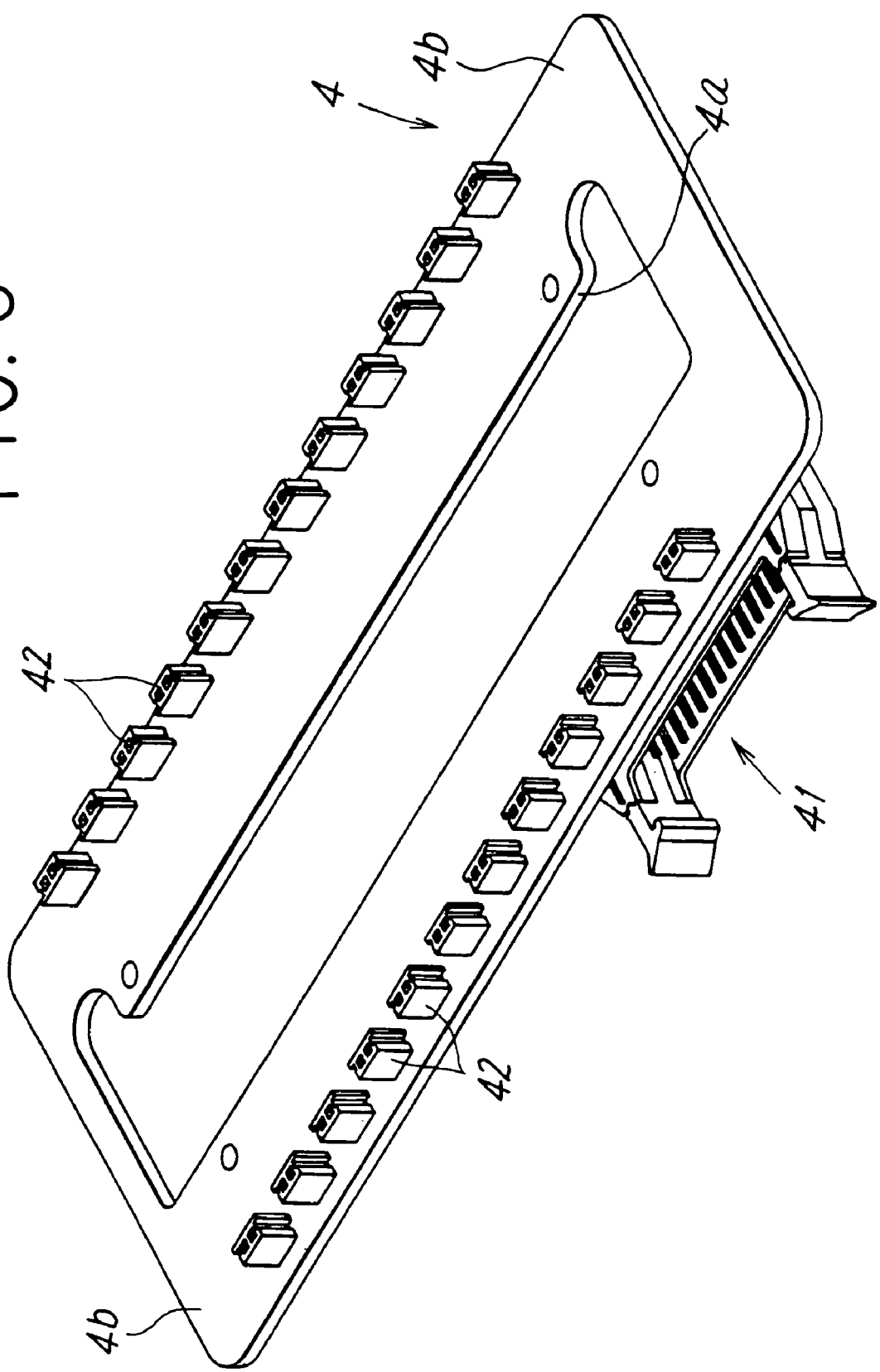
FIG. 3 is a perspective view of a board used in the device.

FIGS. 1 to 3 show an embodiment of a board-mounted manifold valve according to the present invention. The board-mounted manifold valve 1 includes a plurality of solenoid valves 2, a manifold base 3 onto which the solenoid valves 2 are mounted, and a board 4 having an electric circuit for supplying these solenoid valves 2.

The solenoid valve 2 has a valve portion 21 formed as a three-port valve and a solenoid portion 22 integrally mounted to the valve portion 21 to drive a valve element 23 of the valve portion 21. The solenoid portion 22 has a movable core 27 for driving the valve element 23 and a solenoid coil 26 for driving the movable core 27. The movable core 27 is controlled by on-off control of the solenoid coil 26. An output port A of the valve portion 21 is connected to an input port P or a discharge port R by bringing the valve element 23 into contact with a valve seat 24 or a valve seat 25 through the movable core 27.

The manifold base 3 is in a shape of a block which is long in one direction. In a substantially central position of an upper face of the manifold base 3, a mounting base portion 5 standing from the upper face and extending in a longitudinal direction of the manifold base is formed. The mounting base portion 5 has a uniform height and a uniform width and the height is greater than a thickness of the board 4. A flat upper face 5a of the mounting base portion 5 is formed as a mounting face for mounting the solenoid valves 2 and is divided into a plurality of mounting areas 5b arranged in a longitudinal direction. In each the mounting area 5b, mounting portions 5c, 5c in a pair are formed on a half portion and the other half portion in a width direction of the mounting base portion 5, i.e., on a left half portion and a right half portion. Solenoid valves 2, 2 in a pair can be mounted to the opposed mounting portions 5c, 5c to face each other and close to each other.

In each the mounting portion 5c, a plurality of openings 31a, 32a, and 33a respectively communicating with the ports P, A, and R of the valve portion 21 of the solenoid valve are formed and the solenoid valve. 2 is fixed to the mounting portion 5c with screws screwed down into screw holes 39 with a seal member provided around the ports P, A, and R.

Inside the manifold base 3, fluid passages 31, 32, and 33 communicating with the openings 31a, 32a, and 33a are formed. The fluid passage 31 communicating with the input port P and the fluid passage 33 communicating with the discharge port R respectively communicate with common flow paths 36 and 37 extending in the longitudinal direction through the manifold base 3. These common flow paths 36 and 37 respectively open in an end face of the manifold base 3. The plurality of fluid passages 32 communicating with the respective output ports A of the solenoid valves respectively communicate with a plurality of output ports 34 open in a side face in a width direction of the manifold base 3. Into these output ports 34, pipe joints 35 for connecting pipes are respectively mounted in sealed states.

The board 4 is in a rectangular shape as a whole as shown in FIGS. 1 to 3 and has a substantially rectangular opening portion 4a formed by hollowing the board 4 in a longitudinal direction at a central portion. With the mounting base portion 5 fitted in the opening portion 4a, the board 4 is placed on a stepped portion 3a of the manifold base 3 and fixed to the manifold base 3 with a plurality of bolts 40. At this time, the mounting base portion 5 projects upward from the board 4 and the solenoid valves 2 are mounted onto the upper face 5a. Therefore, a gap G is formed between the solenoid portions 22 of the solenoid valves 2 and the board 4 and the upper face of the board 4 is covered with the solenoid portion 22 through the gap G.

The board 4 has extension portions 4b, 4b extending in directions of left and right opposite side faces from the upper face of the manifold base 3 as shown in FIG. 1. To a lower face of one of the extension portions 4b, i.e., the extension portion 4b extending on a side opposite to a side of the manifold base 3 provided with the output port 34, a connector 41 for one-operation wiring is mounted. To an upper face of this extension portion 4b, a plurality of supplying connectors 42 having supplying terminals 42a are mounted. Each the supplying connector 42 is connected to a receiving terminal 45 of the solenoid valve 2 in a plug-in manner simultaneously with mounting of the solenoid valve 2 onto the mounting base portion 5.

Each the supplying connector 42 has a terminal pin 42b for connecting the supplying terminal 42a to an electric circuit formed on the board 4 by printed wiring and the electric circuit is electrically connected to the connector 41 for one-operation wiring. It is possible to add desired circuits such as overvoltage and/or overcurrent protection circuit(s) necessary for actuation of the solenoid valves 2 to this electric circuit and to mount electric components for this purpose as necessary.

In each the mounting area 5b on the upper face 5a of the mounting base portion 5 in the manifold base 3, the two solenoid valves 2, 2 are mounted to face each other in the opposed mounting portions 5c, 5c as described above. The solenoid portions 22 of these solenoid valves 2, 2 extend in opposite directions from the mounting base portion 5 extend respectively over the extension portions 4b of the board 4, and are electrically connected to the electric circuit on the board 4 through the receiving terminal 45 and the supplying connectors 42. Simultaneously with this electrical connection, the solenoid portions 22 cover the upper face of the board 4 with the gap G maintained between the board 4 and the solenoid portions 22 and perform a function of protecting the board 4 and the electric circuit. As a result, the board 4 which tends to increase in size so as to be connected to the plurality of solenoid valves become less liable to be acted on by external forces caused by contact with a foreign object and the electric circuit on a surface of the board 4 becomes less liable to be damaged.

In the board-mounted manifold valve 1 having the above structure, because the plurality of pairs each formed by opposing the two solenoid valves 2, 2 to each other are mounted on the upper face 5a of the mounting base portion 5, it is possible to dispose many solenoid valves in limited space on the manifold base 3. Because the mounting base portion 5 is formed in a central position of the upper face of the manifold base 3 and the board 4 is mounted onto the manifold base 3 with the opening portion 4a of the board 4 fitted with the mounting base portion 5, the board 4 can be mounted with a simple structure to the manifold base 3 easily and stably while kept in balance.

Because the output ports 34 communicating with the output ports of all the solenoid valves 2 are arranged in the one side face of the manifold base 3 and the connector 41 for one-operation wiring is provided to the extension portion 4a of the board 4 in the other side face, the structure is simplified and rationalized to facilitate maintenance and inspection and to simplify installation of wiring and piping.

Although the three-port valve is used as the solenoid valve 2, the number of ports of the solenoid valve is not limited to three but may be two, four, or five, for example. In this case, the number and an arrangement of openings formed in each the mounting portion 5c, 5c on the upper face 5a of the mounting base portion 5 is determined according to the number and an arrangement of the ports of the solenoid valve to be used.

Figure 4:
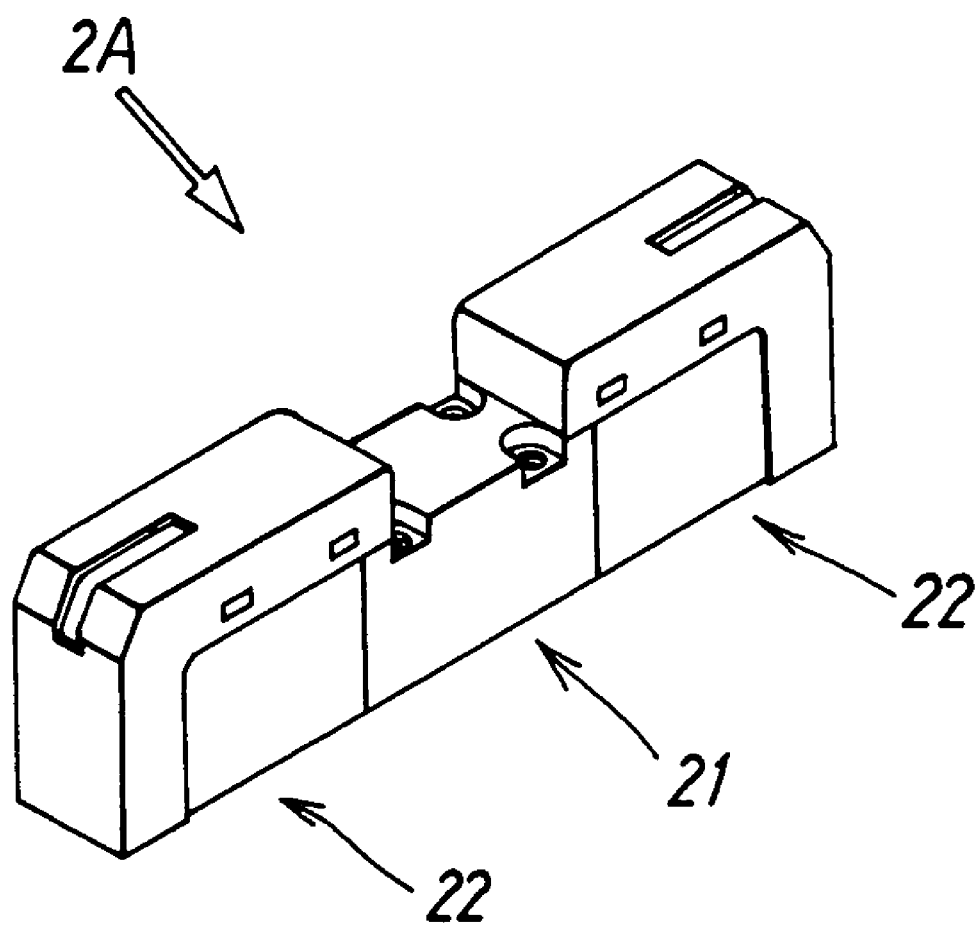
FIG. 4 is a perspective view of a double-solenoid solenoid valve.

It is also possible to use a double-solenoid solenoid valve 2A having two solenoid portions 22, 22 shown in FIG. 4 instead of the single-solenoid solenoid valve 2 having the one solenoid portion 22 in the above embodiment. In this solenoid valve, one solenoid portion 22 needs to be disposed on each side of the valve portion 21 as shown in the drawing and these solenoid portions 22, 22 extend on left and right opposite sides of the mounting base portion 5. In this case, instead of forming two mounting portions 5c, 5c in each the mounting area 5b as in the above embodiment, only one mounting portion is formed and openings the number and arrangement of which are determined according to the double-solenoid solenoid valve are formed in the mounting portion.

The invention claimed is:

1. A board-mounted manifold valve comprising: a plurality of solenoid valves each including a valve portion and one or two solenoid portion(s); a manifold base onto which these solenoid valves are mounted; and a board in which an electric circuit for supplying the solenoid valves is incorporated, wherein the manifold base includes a mounting base portion standing upward from an upper face of the manifold base and extending in a longitudinal direction of the manifold base, a plurality of mounting areas arranged in a longitudinal direction of the mounting base portion on an upper face of the mounting base portion, one or two mounting portion(s) formed in each the mounting area, a plurality of openings formed in each the mounting portion, and fluid passages communicating with ports of the solenoid valves through the openings, a height of the mounting base portion being greater than a thickness of the board, the board has an opening portion at its central portion and extending in its longitudinal direction and is mounted onto the manifold base with the mounting base portion fitted in the opening portion and with the mounting base portion projecting upward from the board, and the solenoid valve is mounted to the mounting portion in each the mounting area on the mounting base portion with the solenoid portion(s) extending over the board from the mounting base portion and is electrically connected to the electric circuit on the board through a supplying connector.

2. A manifold valve according to claim 1, wherein each the solenoid valve is a single-solenoid solenoid valve having one solenoid portion, each the mounting area of the mounting base portion in the manifold base has two opposed mounting portions positioned on a half portion side and the other half portion side in a width direction of the mounting base portion, a pair of the solenoid valves are mounted close to each other to face each other in the mounting portions, the solenoid portions of the respective solenoid valves extend in opposite directions to each other from the mounting base portion to cover the board.

3. A manifold valve according to claim 1, wherein each the solenoid valve is a double-solenoid solenoid valve having two solenoid portions on opposite sides of the valve portion, each the mounting area of the mounting base portion in the manifold base has one mounting portion, the solenoid valve is mounted in the mounting portion with the two solenoid portions extending in opposite directions to each other from the mounting base portion, and the respective solenoid portions cover the board.

4. A manifold valve according to claim 1, wherein the board has extension portions extending in directions of left and right opposite side faces of the manifold base, the supplying connector is mounted in positions on the extension portions and corresponding to the respective solenoid valves, the solenoid portions of the solenoid valves extend over the extension portions of the board to cover the upper face of the board with a gap maintained between the board and the solenoid portions, and a receiving terminal to be connected to the supplying connector is provided to each the solenoid portion.

5. A manifold valve according to claim 1, wherein the board has a one-operation wiring connector and the one-operation wiring connector is connected to the respective supplying connectors through the electric circuit.

6. A manifold valve according to claim 4, wherein the board has a one-operation wiring connector and the one-operation wiring connector is connected to the respective supplying connectors through the electric circuit.

7. A manifold valve according to claim 5, wherein the one-operation wiring connector is provided to a lower face of one of the left and right extension portions of the board.

8. A manifold valve according to claim 6, wherein the one-operation wiring connector is provided to a lower face of one of the left and right extension portions of the board.

9. A manifold valve according to claim 5, wherein output ports communicating with output ports of the respective solenoid valves are arranged in one of side faces of the manifold base and the one-operation wiring connector is provided to one of the left and right extension portions of the board opposite to a side on which the output ports are formed.

10. A manifold valve according to claim 6, wherein output ports communicating with output ports of the respective solenoid valves are arranged in one of side faces of the manifold base and the one-operation wiring connector is provided to one of the left and right extension portions of the board opposite to a side on which the output ports are formed.

11. A manifold valve according to claim 7, wherein output ports communicating with output ports of the respective solenoid valves are arranged in one of side faces of the manifold base and the one-operation wiring connector is provided to one of the left and right extension portions of the board opposite to a side on which the output ports are formed.

12. A manifold valve according to claim 8, wherein output ports communicating with output ports of the respective solenoid valves are arranged in one of side faces of the manifold base and the one-operation wiring connector is provided to one of the left and right extension portions of the board opposite to a side on which the output ports are formed.

* * * * *